United States Patent
Heneveld (10) Patent No.: US 11,739,691 B2
(45) Date of Patent: Aug. 29, 2023

(54) ENGINE COMPONENT

(71) Applicant: Raytheon Technologies Corporation, Farmington, CT (US)

(72) Inventor: Benjamin Heneveld, Arlington, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 511 days.

(21) Appl. No.: 16/022,658

(22) Filed: Jun. 28, 2018

(65) Prior Publication Data

US 2020/0003120 A1    Jan. 2, 2020

(51) Int. Cl.
*F02C 7/18* (2006.01)
*F01D 25/12* (2006.01)
*F02C 7/12* (2006.01)

(52) U.S. Cl.
CPC ............... *F02C 7/18* (2013.01); *F01D 25/12* (2013.01); *F02C 7/12* (2013.01); *F05D 2260/2212* (2013.01)

(58) Field of Classification Search
CPC .... F02C 7/18; F01D 25/12; F05D 2260/2212; F05D 2260/2214
See application file for complete search history.

(56) References Cited

U.S. PATENT DOCUMENTS

| | | | |
|---|---|---|---|
| 6,402,464 B1 * | 6/2002 | Chiu ...................... | F01D 5/288 165/133 |
| 6,598,781 B2 | 7/2003 | Hasz et al. | |
| 7,919,151 B2 | 4/2011 | Deng et al. | |
| 2009/0183850 A1* | 7/2009 | Morrison ................ | B22F 7/062 164/91 |
| 2011/0033312 A1* | 2/2011 | Lee ......................... | F01D 5/18 416/97 R |
| 2013/0280092 A1* | 10/2013 | Xu ......................... | B22F 3/1055 416/97 R |
| 2015/0198380 A1 | 7/2015 | Haj-Hariri et al. | |
| 2017/0159487 A1* | 6/2017 | Stapleton ................ | F01D 25/12 |
| 2017/0191417 A1 | 7/2017 | Bunker et al. | |

FOREIGN PATENT DOCUMENTS

| | | |
|---|---|---|
| DE | 102009003898 A1 | 7/2010 |
| EP | 0926261 A2 | 6/1999 |
| EP | 1186749 A1 | 3/2002 |
| EP | 1935509 A1 | 6/2008 |

(Continued)

OTHER PUBLICATIONS

European Search Report Issued in European Application No. 19183424.1 dated Nov. 13, 2019; 9 Pages.

(Continued)

*Primary Examiner* — Steven M Sutherland (74) *Attorney, Agent, or Firm* — Cantor Colburn LLP (57) ABSTRACT

A combustion engine component is disclosed. The combustion engine component comprises a body that includes a first surface in operative thermal communication with a hot combustion gas, and a second surface in operative fluid communication with a cooling fluid. Also, as disclosed in greater detail below, the second surface includes a first surface contour feature configured to increase a contact angle of a liquid on the second surface.

16 Claims, 5 Drawing Sheets

(56) References Cited

FOREIGN PATENT DOCUMENTS

| | | |
|---|---|---|
| WO | 2011089025 A2 | 7/2011 |
| WO | 2013019257 A1 | 2/2013 |
| WO | 2013133997 A1 | 9/2013 |

OTHER PUBLICATIONS

W. Barthlott, C. Neinhuis, "Suface Allows self-cleaning" Sacred Lotus, Sep. 14, 2016, p. 1-9.
European Office Action for EP Application No. 19183424.1, dated May 20, 2021, pp. 1-7.

* cited by examiner

ENGINE COMPONENT

BACKGROUND

Exemplary embodiments of this disclosure relate to engine components such as gas turbine engine components.

Components on engines such as gas turbine engines can be subjected to high temperatures. Often, the conditions in which the components are operated exceed a maximum useful temperature of the material of which the components are formed. For example, temperatures in high pressure turbines on aircraft engines can be in the range of 1000-2000° C., and temperatures in low pressure turbines can be in the range of 500-700° C. Accordingly, engine components such as components in the hot section of a gas turbine engine can be cooled with a cooling fluid such as air from upstream of an engine combustor. Maintaining the efficiency of the cooling of such components is beneficial because a loss of cooling efficiency can result in exposure of the components to undesirably high temperatures, which in turn can lead to increased maintenance requirements, shortened component lifespan, or even component failure.

BRIEF DESCRIPTION

A combustion engine component is disclosed. The combustion engine component comprises a body that includes a first surface in operative thermal communication with a hot combustion gas, and a second surface in operative fluid communication with a cooling fluid. Also, as disclosed in greater detail below, the second surface includes a first surface contour feature configured to increase a contact angle of a liquid on the second surface.

A gas turbine engine is also disclosed. The gas turbine engine includes a combustor, a turbine, and a compressor in operative communication. The engine also includes a hot gas flow path for combustion gas produced in the combustor. The engine also includes a gas turbine engine component comprising a body that includes a first surface in operative thermal communication with a hot combustion gas, and a second surface in operative fluid communication with a cooling fluid. Also, as disclosed in greater detail below, the second surface includes a first surface contour feature configured to increase a contact angle of a liquid on the second surface.

In addition to one or more of the features described above, or as an alternative to any of the foregoing embodiments, the second surface is at a temperature of at least 2200° F. (1200° C.).

In addition to one or more of the features described above, or as an alternative to any of the foregoing embodiments, the first surface contour feature can include a plurality of first surface projections disposed on the second surface and individually configured as conical, or as truncated spheres or truncated spheroids In addition to one or more of the features described above, or as an alternative to any of the foregoing embodiments, the first surface contour feature can include a plurality of first surface projections disposed on the second surface including a first characteristic dimension of less than 0.02 inches (0.51 mm).

In addition to one or more of the features described above, or as an alternative to any of the foregoing embodiments, the first characteristic dimension can be at least 0.00001 inches (0.25 µm).

In addition to one or more of the features described above, or as an alternative to any of the foregoing embodiments, the first characteristic dimension can be selected from a height, a width, or a spacing between adjacent surface projections.

In addition to one or more of the features described above, or as an alternative to any of the foregoing embodiments, the first surface contour feature of the second surface can include a surface roughness Ra of 0.00005-0.01 inches (1.3 µm-0.25 mm), and RΔa of 0.00001-0.005 inches (0.25 µm-0.13 mm).

In addition to one or more of the features described above, or as an alternative to any of the foregoing embodiments, the second surface further can include a second surface contour feature disposed on the second surface.

In addition to one or more of the features described above, or as an alternative to any of the foregoing embodiments, the second surface contour feature can be arranged as turbulators on the second surface.

In addition to one or more of the features described above, or as an alternative to any of the foregoing embodiments, the second surface further can include a second surface contour feature disposed on the second surface, said second surface contour feature comprising a plurality of second surface projections including a second characteristic dimension greater than the first characteristic dimension.

In addition to one or more of the features described above, or as an alternative to any of the foregoing embodiments, the second characteristic dimension can be 0.001-0.25 inches (0.13 µm-5.1 cm).

In addition to one or more of the features described above, or as an alternative to any of the foregoing embodiments, the second characteristic dimension can be selected from a height, a width, or a spacing between adjacent second surface projections.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Figure 1:
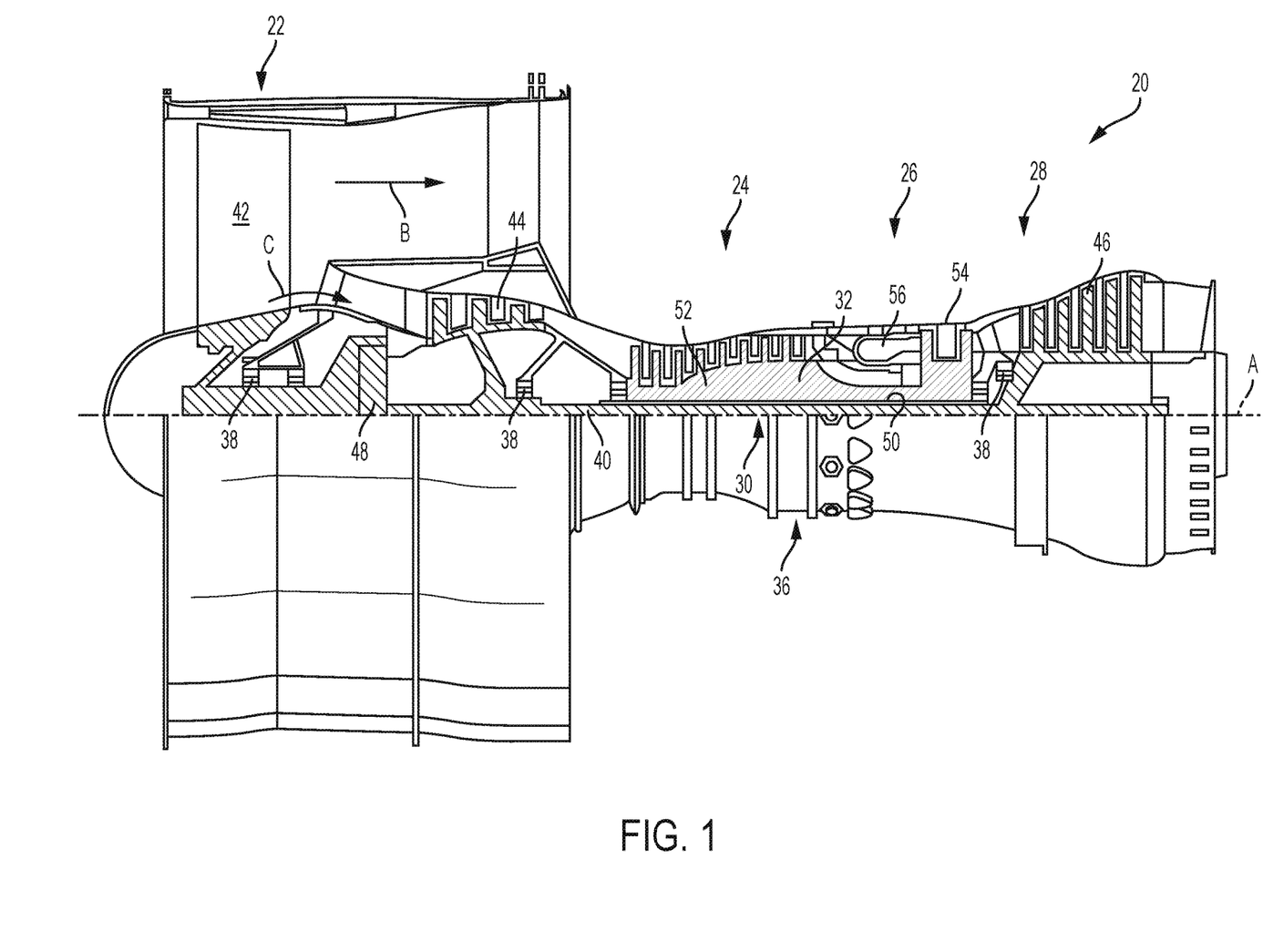
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

The maintenance of cooling efficiency of hot engine components (e.g. components in a hot section of a gas turbine engine, such as components in the combustor section 26 or in the turbine section 28) can be important for reasons such as product life and reliability. However, it has been discovered that contaminants in cooling fluid (e.g., cooling air) can accumulate on the surface being cooled, which can result in a loss of cooling efficiency. It has been further discovered that the problem can become worse for hot engine components that experience temperatures of at least 2200° F. (1200° C.) during operation, at which contaminants such as silicates of metals such as calcium, magnesium, aluminum, or any combination thereof (also known as calcium-magnesium-aluminum-silicate ("CMAS")), or different sand, dust, and ash particulates of varying compositions can melt and fuse to the cooling surface. Surface contour features designed to promote turbulent coolant flow or to increase cooling surface area can further exacerbate the problem of melting contaminants by contributing to wicking of any molten contaminants to spread them across the surface.

Figure 2A:
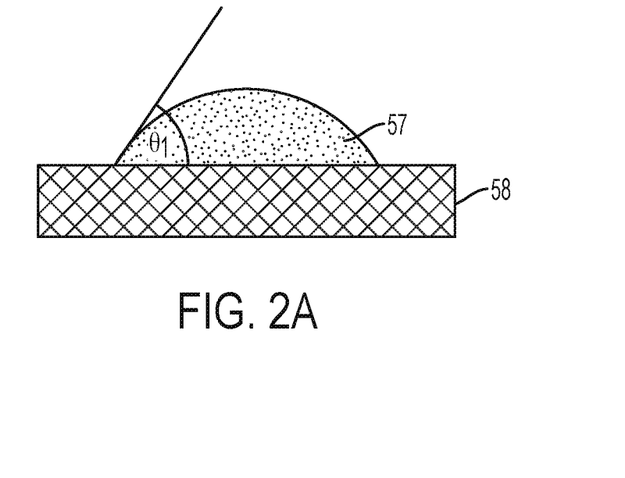
FIGS. 2A and 2B each schematically show contact angle of a liquid on a surface increased by a surface contour feature.
Figure 2B:
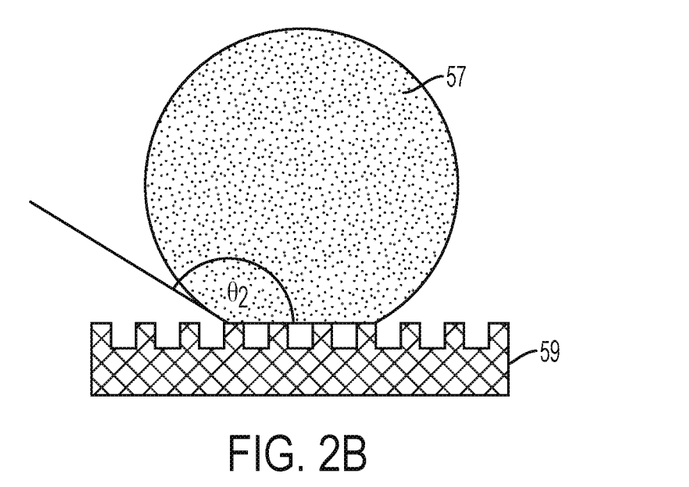

As disclosed herein, a cooling surface on an engine component is provided with a first surface contour feature configured to increase a contact angle of a liquid on the surface. Such surface contour features are typically small, and can be significantly smaller than surface contour features typically included on engine component cooling surfaces for greater surface area or turbulent coolant flow. An example embodiment of the impact of surface contour features on liquid contact angle is schematically shown in FIGS. 2A and 2B. FIG. 2A shows a contact angle θ1 of a liquid 57 on a smooth surface 58 and FIG. 2B shows a contact angle θ2 of the liquid 57 on a contoured surface 59. The contact angle of a liquid on a solid surface in a gas atmosphere can be modeled by the Young equation:

$$\gamma_{SG} = \gamma_{SL} + \gamma_{LG} \cos \theta$$

where $\gamma_{SG}$ is the interfacial tension between the solid and the gas, $\gamma_{SL}$ is the interfacial tension between the solid and the liquid, $\gamma_{LG}$ is the interfacial tension between the liquid and the gas, and θ is the contact angle between the liquid and the solid. A textured surface can increase the surface angle from θ₁ to θ₂, and if conditions for the Cassie-Baxter model:

$$\cos(\theta) < (\varphi - 1)/(r - \varphi)$$

are satisfied (in which φ is area fraction of the solid that touches the liquid and r is a solid roughness ratio for which a smooth surface equals 1), then the liquid can be suspended on the tops of surface contour roughness projections as shown in FIG. 2B, also known as "Cassie's regime". In other embodiments, the surface angle can be reduced without suspending the liquid on top of the surface features, also known as a Wenzel regime in which $\cos(\theta_W^*) = r \cos(\theta)$.

In some embodiments, the first surface contour feature can include projections normal to the surface at the location of the projection. In some embodiments, the first surface feature or projection can have a characteristic dimension. In some embodiments, the characteristic dimension can be a height of a projection from the surface, or a width of a projection from the surface, or a spacing between adjacent projections. In some embodiments, a characteristic dimension for anti-wetting surface contour features can be in a range with a lower end of 0.00001 inches (0.25 µm), 0.00004 inches (1.0 µm), or 0.0002 inches (5.1 µm), and an upper end of 0.0001 inches (2.5 µm), 0.001 inches (25 µm), or 0.01 inches (0.25 mm). The above range endpoints can be independently combined to make a number of different ranges, and each possible combination is hereby expressly disclosed. In some embodiments, the specified characteristic dimension or range of dimensions can be individually applied to any of a height of the surface contour features, or a width of the surface contour features, or a spacing between adjacent surface contour features. In some embodiments, the specified characteristic dimension or range of dimensions can be applied to a height of the surface contour features and to a width of the surface contour features. In some embodiments, the specified characteristic dimension or range of dimensions can be applied to a width of the surface contour features and to a spacing between adjacent surface contour features. In some embodiments, the specified characteristic dimension or range of dimensions can be applied to a height of the surface contour features and to a spacing between adjacent surface contour features. In some embodiments, the specified characteristic dimension or range of dimensions can be applied to a height of the surface contour features and to a width of the surface contour features and to a spacing between adjacent surface contour features.

In some embodiments, the surface contour feature can be characterized by a surface roughness parameter, such as Ra. Ra and other surface roughness parameters such as RΔa, or Δi are defined at ASME B46.1 2009, and can be measured by commercially-available surface profile measuring devices. In some embodiments, the first surface contour feature can include Ra surface roughness value in a range with a lower end of 0.00005 inches (1.3 µm), 0.0002 inches (5.1 µm), or 0.001 inches (25 µm), and an upper end of 0.0004 inches (10 µm), 0.002 inches (51 µm), 0.01 inches (0.25 mm), or 0.02 inches (0.51 mm). The above range endpoints can be independently combined to make a number of different ranges, and each possible combination is hereby expressly disclosed. In some embodiments, the contour feature can include RΔa value in a range with a lower end of 0.00001 inches (0.25 µm), 0.00004 inches (1.0 µm), or 0.0002 inches (5.1 µm), and an upper end of 0.0002 inches (5.1 µm), 0.001 inches (25 µm), or 0.005 inches (0.13 mm). The above range endpoints can be independently combined to make a number of different ranges, and each possible combination is hereby expressly disclosed. In some embodiments, the contour feature can include Δi value in a range with a lower end of 0.00002 inches (0.51 µm), 0.0001 inches (2.5 µm), or 0.0005 inches (13 µm), and an upper end of 0.0004 inches (10 µm), 0.002 inches (51 µm), or 0.01 inches (0.25 mm). The above range endpoints can be independently combined to make a number of different ranges, and each possible combination is hereby expressly disclosed. In some embodiments, the surface hierarchical surface roughness with nanoscale and microscale structural or roughness features. In some non-limiting examples, a hierarchical surface contour can include a microscale roughness with Ra surface roughness values ranging from approximately 5 microns to approximately 100 microns and nanoscale roughness with Ra values ranging from approximately 250 nanometers to approximately 750 nanometers.

The first surface contour features can take various forms, including but not limited to conical shapes, truncated spheroids (e.g., truncated prolate spheroids, truncated oblate spheroids), or truncated spheres (e.g., hemispherical or other truncated spherical projections, or projections that terminate in a hemispherical or other truncated sphere). Additionally, although the Although this disclosure is not bound by any particular theory of operation, it is believed that the first surface contour feature can provide a plurality of points of contact with a liquid droplet, each with a high contact angle so that surface energies for wetting are inhibited. The amount of surface area in actual contact with contaminant particles or droplets is low so that adhesion of the contaminant(s) to the surface is inhibited, and a reduction in contact angle results in a reduction in amount of surface of a volume of liquid that is in contact with the surface, and greater surface area of the liquid in contact with the surrounding atmosphere. This can allow for reduced friction with the surface and greater lateral force from air flow, which can promote removal of liquid droplets from the surface. In some embodiments, the surface is configured to increase contact angle and reduce surface contact area in a Wenzel regime. In some embodiments the surface is configured to suspend liquid on the tops of individual surface contour projections in a Cassie regime. The surface contour features can also provide other technical benefits, such as providing increased surface area for heat transfer. Additionally, in the event that contaminant(s) do adhere to the surface, in some embodiments the contaminant(s) will be more likely located at the bottom of gaps between macro surface contour features as described in greater detail below, leaving distal portions of the surface contour features to provide surface for heat transfer.

Figure 3:
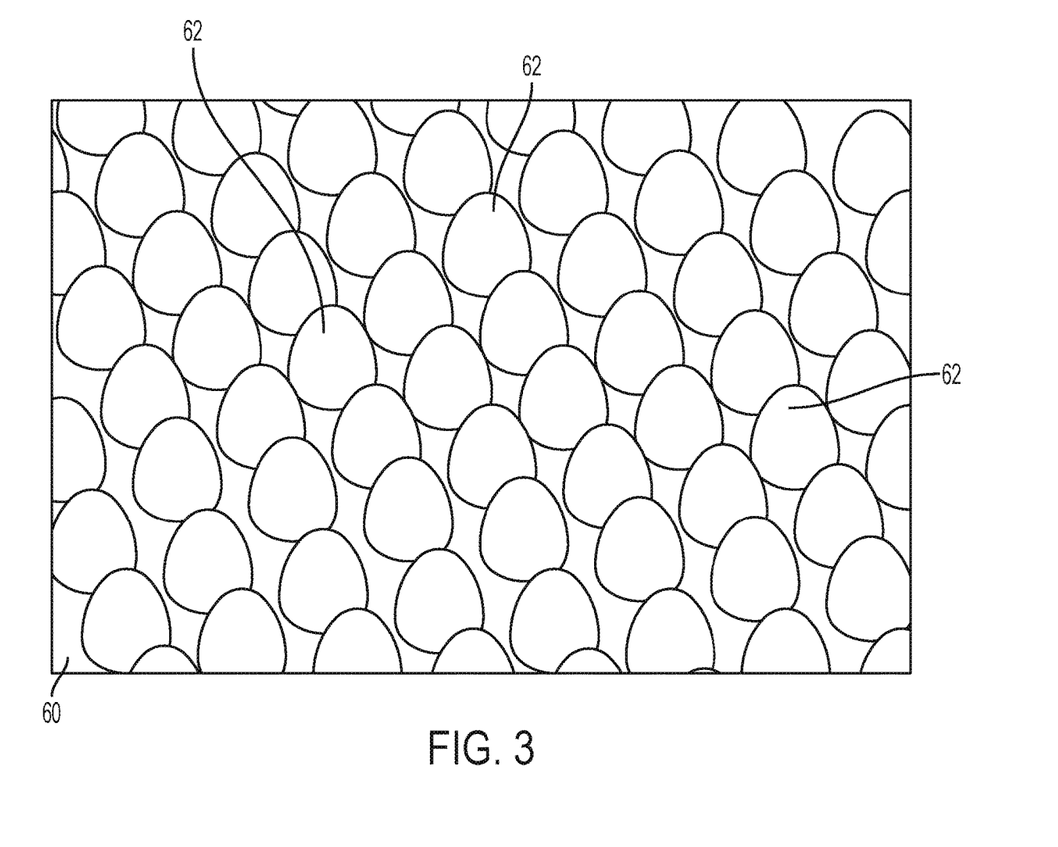
FIG. 3 is a perspective view of a cooling surface of an engine component with truncated spheroid surface contour features.
Figure 4:
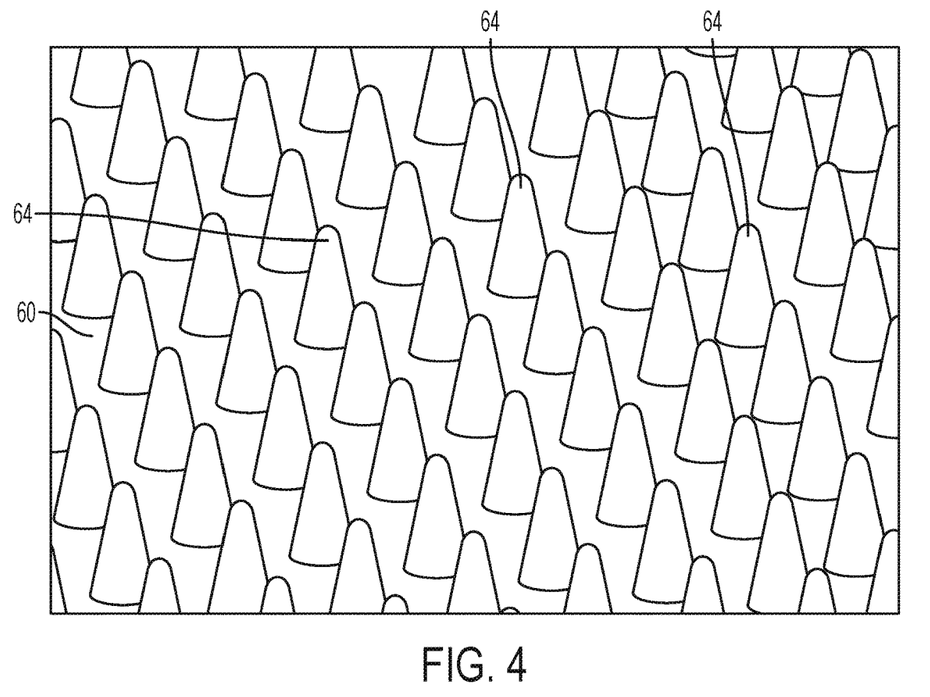
FIG. 4 is a perspective view of a cooling surface of an engine component with truncated spherical surface contour features.
Figure 5:
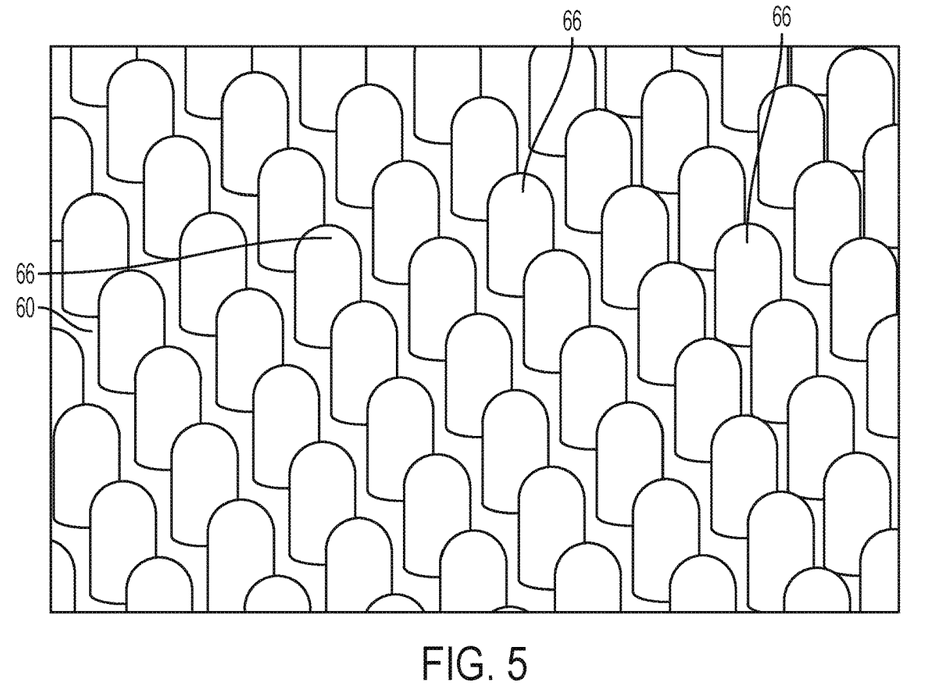
FIG. 5 is a perspective view of a cooling surface of an engine component with conical surface contour features.

With reference now to FIGS. 3-5, FIG. 3 is a schematic depiction of an engine component surface 60 with truncated prolate spheroid surface contour features 62 projecting therefrom. FIG. 4 is a schematic depiction of an engine component surface 60 with conical surface contour features 64 projecting therefrom. FIG. 5 is a schematic depiction of an engine component surface 60 with hemisphere-terminated surface contour features 66 projecting therefrom. In some embodiments, the surface projections can be discrete as shown in FIGS. 3-5, but in some embodiments the surface projections can instead form a continuous upper surface interspersed with discrete recesses (e.g., a grid structure with transverse grid lines forming a continuous upper surface interspersed with discrete recesses between the grid lines). Surface contour features configured or arranged to inhibit wetting such as the surface contour features described above can be fabricated in various ways.

In some embodiments, surface contour features can be fabricated using micro-lamination investment casting techniques such as described in US patent application Publication No. 2004/0156478 A1, the disclosure of which is incorporated herein by reference in its entirety. In some embodiments, surface contour features can be fabricated using 3D printing techniques or other additive manufacturing techniques such as selective laser sintering, direct laser sintering, electron beam melting, selective laser melting, using powder or other metal build material as required by the technique. Subtractive manufacturing techniques such as masking and etching including reactive or energetic etching techniques such as chemical etching, plasma etching, or laser or electron beam etching.

In some embodiments, the engine component surface 60 can include a second surface feature. A second surface contour feature can be included, for example, to provide increased surface area for heat transfer or to promote turbulent coolant flow, thereby promoting effective heat transfer. Such surface contour features can be macro features, i.e., larger surface contour features that can provide a hierarchical surface contour in combination with the first surface contour feature. In some embodiments, the surface contour features can include projections normal to the surface at the location of the projection. In some embodiments, the surface projections can be discrete projections as shown in FIGS. 3-5, but in some embodiments the surface projections can instead form a continuous upper surface interspersed with discrete recesses (e.g., a grid structure with transverse grid lines forming a continuous upper surface interspersed with discrete recesses between the grid lines).

Figure 6:
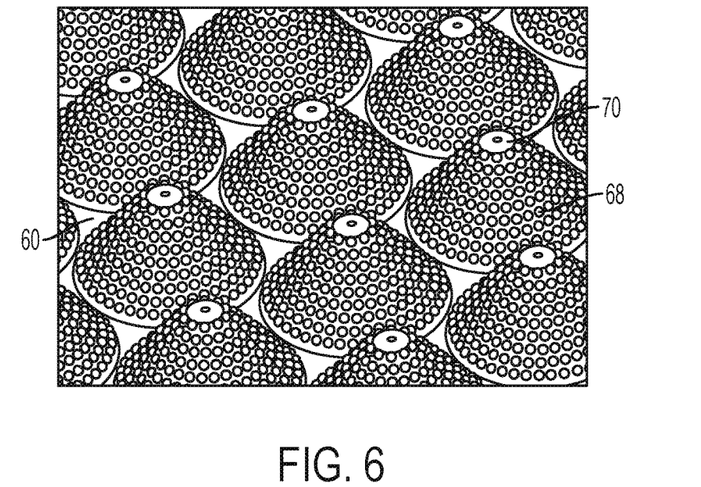
FIG. 6 is a perspective view of a cooling surface of an engine component with first and second surface contour features.

In some embodiments, the second surface feature or projection can have a characteristic dimension. In some embodiments, the characteristic dimension can be a height of a projection from the surface, or a width of a projection from the surface, or a spacing between adjacent projections. In some embodiments, a characteristic dimension for the second surface contour features can be in a range with a lower end of 0.001 inches (25 μm), 0.004 inches (0.10 mm), or 0.02 inches (0.51 mm), and an upper end of 0.01 inches (0.25 mm), 0.05 inches (1.3 mm), or 0.25 inch (6.4 mm). The above range endpoints can be independently combined to make a number of different ranges, and each possible combination is hereby expressly disclosed. In some embodiments, the specified characteristic dimension or range of dimensions can be individually applied to any of a height of the surface contour features, or a width of the surface contour features, or a spacing between adjacent surface contour features. In some embodiments, the specified characteristic dimension or range of dimensions can be applied to a height of the surface contour features and to a width of the surface contour features. In some embodiments, the specified characteristic dimension or range of dimensions can be applied to a width of the surface contour features and to a spacing between adjacent surface contour features. In some embodiments, the specified characteristic dimension or range of dimensions can be applied to a height of the surface contour features and to a spacing between adjacent surface contour features. In some embodiments, the specified characteristic dimension or range of dimensions can be applied to a height of the surface contour features and to a width of the surface contour features and to a spacing between adjacent surface contour features. An example embodiment of a portion of a surface 60 of an engine component is shown in FIG. 6 with hemispherical first surface contour features 68, and conical second surface contour features 70.

Figure 7:
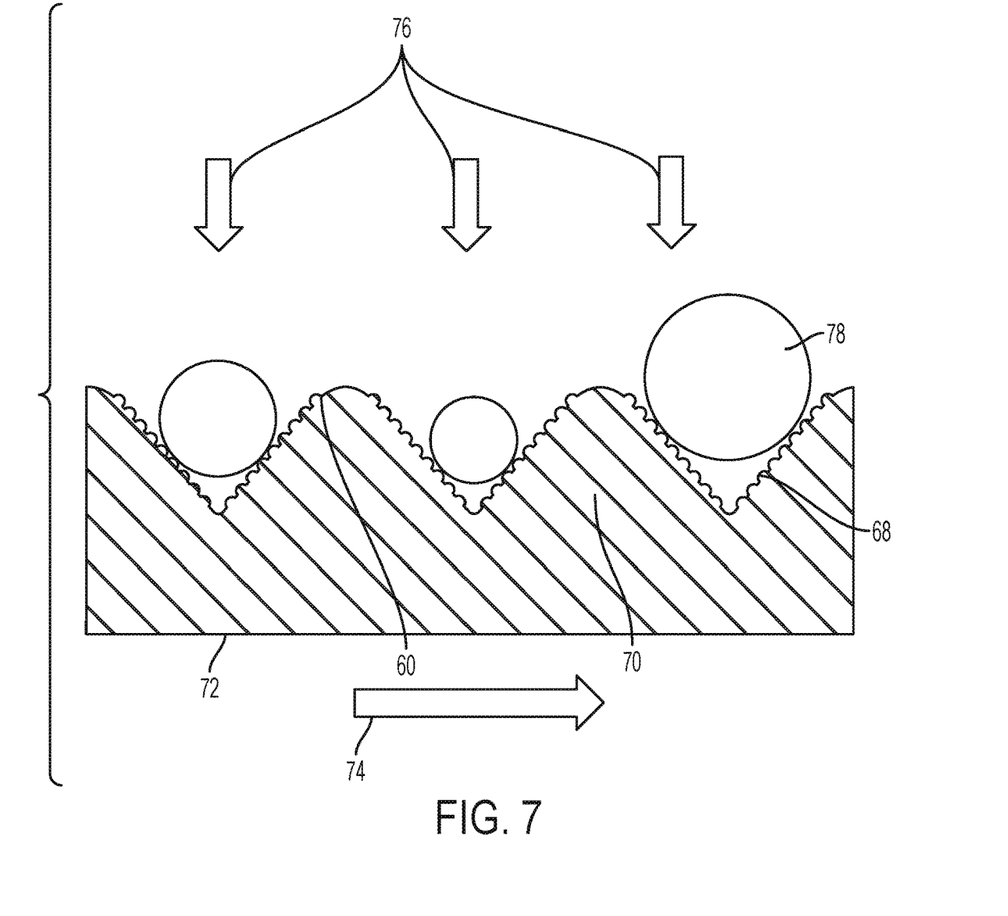
FIG. 7 is a cross-sectional view of a cooling surface of an engine component with first and second surface contour features and liquid droplets in a non-wetted configuration.

Surface contour features as described can be included on a variety of engine components, including but not limited to combustor panels, or turbine components such as vanes, blades, outer seals, or casings. Examples of materials for such components can include titanium alloys or super-alloys based on nickel, cobalt, or iron, or ceramic matrix composite materials. An example embodiment of a portion of an engine component is schematically shown in FIG. 7. As shown in FIG. 7, the engine component has a first surface 72 that is in fluid and thermal communication with hot combustion gas on a hot combustion gas flow path 74, and a second surface 60 that is in fluid and thermal communication with a cooling fluid on a cooling fluid flow path 76. The second surface 60 includes first surface contour features 68 and second surface contour features 70. Liquid droplets 78 are shown in a beaded configuration (not wetted on the surface) supported on the first surface contour features 68.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A combustion engine component, comprising:
a body comprising a first surface in operative thermal communication with a hot combustion gas, and a second surface in operative fluid communication with a cooling fluid,
wherein the second surface includes a first surface contour feature and the first surface contour feature includes a plurality of first surface projections disposed on the second surface and having a height of less than 0.001 inches (25 μm).

2. The combustion engine component of claim 1, wherein the plurality of first surface projections disposed on the second surface are individually configured as conical, or as truncated spheres or truncated spheroids.

3. The combustion engine component of claim 1, wherein the height is at least 0.00001 inches (0.25 μm).

4. The combustion engine component of claim 1, wherein the first surface contour feature of the second surface includes a surface roughness Ra of 0.00005-0.0.002 inches (1.3 μm-51 μm), and RΔa of 0.00001-0.0.001 inches (0.25 μm-25 μm).

5. The combustion engine component of claim 1, wherein the second surface further includes a second surface contour feature disposed on the second surface.

6. The combustion engine component of claim 5, wherein the second surface contour features are arranged as turbulators on the second surface.

7. The combustion engine component of claim 1, wherein the second surface further includes a second surface contour feature disposed on the second surface, said second surface contour feature comprising a plurality of second surface projections having a height greater than the height of the first surface projections.

8. The combustion engine component of claim 7, wherein the height of the second surface projections is 0.001-0.25 inches (0.13 μm-5.1 cm).

9. A gas turbine engine, comprising:
a combustor, a turbine, and a compressor in operative communication;
a hot gas flow path for combustion gas produced in the combustor;
a gas turbine engine component comprising:
a body comprising a first surface in operative thermal communication with the hot gas flow path, and a second surface in operative fluid communication with a cooling fluid,
wherein the second surface includes a first surface contour feature and the first surface contour feature includes a plurality of first surface projections disposed on the second surface and having a height of less than 0.001 inches (25 micrometers).

10. The gas turbine engine of claim 9, wherein the second surface is at a temperature of at least 2200° F. (1200° C.).

11. The gas turbine engine of claim 9, wherein the plurality of first surface projections disposed on the second surface are individually configured as conical, or as truncated spheres or truncated spheroids.

12. The gas turbine engine of claim 9, wherein the height is at least 0.00001 inches (0.25 μm).

13. The gas turbine engine of claim 9, wherein the first surface contour feature of the second surface includes a surface roughness Ra of 0.00005-0.002 inches (1.3 μm-51 μm), and RΔa of 0.00001-0.001 inches (0.25 μm-25 μm).

14. The gas turbine engine of claim 9, wherein the second surface further includes a second surface contour feature disposed on the second surface.

15. The gas turbine engine of claim 14, wherein the second surface contour features are arranged as turbulators on the second surface.

16. The gas turbine engine of claim 9, wherein the second surface further includes a second surface contour feature disposed on the second surface, said second surface contour feature comprising a plurality of second surface projections including a height greater than the height of the first surface projections.

* * * * *